United States Patent

[11] 3,613,102

[72] Inventors  Nelson B. Daly, deceased
 late of Wilmington, Del. by Evelyn Silvers Daly, executrix;
 Walter W. Gilbert, Hockessin; George R. Nacci, Fairfax, Wilmington, Del.
[21] Appl. No. 773,974
[22] Filed Nov. 6, 1969
[45] Patented Oct. 12, 1971
[73] Assignee E. I. de Pont de Nemours and Company
 Wilmington, Del.
 Continuation-in-part of application Ser. No. 464,811, June 17, 1965, now abandoned, which is a continuation-in-part of application Ser. No. 454,767, Apr. 26, 1965, now abandoned.

[54] COPYING MAGNETIC SIGNALS BY THERMOREMANENT TRANSFER
 6 Claims, No Drawings
[52] U.S. Cl. ...................................... 346/74 MT, 179/100.2 CR
[51] Int. Cl. ...................................... H01v 3/04
[50] Field of Search ........................... 346/74 M, 74 T; 179/100.2 E, 100.2 CR

[56] References Cited
UNITED STATES PATENTS
3,364,496  1/1968  Greiner et al. ............... 346/74
3,465,105  9/1969  Kumada et al. ............. 346/74

Primary Examiner—Bernard Konick
Assistant Examiner—Gary M. Hoffman
Attorney—D. R. J. Boyd ABSTRACT: Signals on magnetic recording members, such as signals recorded on magnetic tape, can be copied by placing the recording in contact with a copying member and transiently heating the magnetic material of the copy member in the vicinity of or above the Curie transition with a pulse of radiant energy, particularly visible or infrared energy.

COPYING MAGNETIC SIGNALS BY THERMOREMANENT TRANSFER

RELATED APPLICATIONS

This application is a continuation-in-part of U.S. application Ser. No. 464,811 filed June 17, 1965, and now abandoned, which is a continuation-in-part of U.S. application Ser. No. 454,767 filed Apr. 26, 1965 and now abandoned.

FIELD OF THE INVENTION

This invention relates to a contact process of transferring a recorded magnetic image by thermoremanent transfer.

Greiner et al. U.S. Pat. 3,364,496 have described a process whereby a magnetic signal can be copied from an original or master to a copy member by thermoremanent transfer. The original copying member has as its active magnetic element a material of relatively high Curie temperature such as iron oxide, $T_c \sim 475°-525° C.$, while the copy member has as its active magnetic element a material of relatively low Curie temperature such as chromium dioxide or modified chromium dioxide ($T_c \sim 70°$ to $170° C.$). The original member having recorded magnetic signals is placed with its magnetic element substantially in contact with the magnetic element of the copy member. The assembly is then heated to a temperature above the Curie temperature of the copy member, but below the Curie temperature of the original member and the assembly is then cooled below the Curie temperature of this copy member while maintaining its position in the magnetic field of the original member. A copy of the signal recorded on the original member is thereby obtained which generally has an intensity of magnetization equal to or greater than that of the original.

A difficulty with the above described process is that the copy and the original must have different working magnetic elements. It is highly desirable to provide a process whereby this restriction is eliminated.

SUMMARY OF THE INVENTION

The process of the present invention employs an original recording member having a signal recorded thereon and a copy member each having a stratum of hard magnetic material as the working element. The copy member is placed to expose the stratum of hard magnetic material to the magnetic field of the signals recorded on the original recording member, then the magnetic material of the copy member is exposed to at least one pulse of exposing radiation capable of heating the magnetic material, while screening the magnetic material of the original member from the pulse of radiation. The intensity of said pulse of radiation is sufficient to heat the magnetic material of the copy member to a temperature at least in the vicinity of the Curie temperature. The magnetic material of the copy member is then permitted to cool substantially below the Curie temperature while in stationary relationship to the original.

DETAILED DESCRIPTION OF THE INVENTION

The process of the present invention is directed to the copying of magnetic signals from an original to a copy member without destruction of the signals recorded on the original.

The term, signal, is employed in a broad sense and is intended to include information such as music, speech, digital code and the like recorded on magnetic recording tape by conventional processes with a recording head. It is also intended to include magnetic images of pictures, documents and the like which can be recorded thermomagnetically by processes described by Sims, U.S. Pat. No. 2,793,135, Burns, U.S. Pat. No. 2,915,594; Nacci, Belgian Pat. No. 672,017; Nacci, Belgian Pat. No. 672,018 and like processes. In the sense employed here, a recorded signal is a spatial variation of magnetization of the magnetic material dispersed in a stratum on a recording member.

Likewise, recording member is intended to include recording tapes coated with magnetic particles in a binder and the like, and recording members suitable for thermomagnetic image recording which includes reflex copying members having a structured stratum such as dot patterns or line patterns of magnetic material on or embedded in a support.

An essential feature of the present invention is that the magnetic material of the copy member be heated to the vicinity of the Curie temperature, and preferably above the Curie temperature. The magnetic material is preferably in the form of fine particles which are bound to a supporting member such as a plastic film with a binder. Such fine particles, particularly when thermally isolated by a binder of low conductivity are readily heated by absorbed radiation.

The temperature to which the magnetic material can be heated is frequently limited by the thermal decomposition of the support or binder. For this reason, and for economy in the use of radiant energy, magnetic materials are preferred which have a relatively low Curie temperature. Outstanding examples of materials which have excellent magnetic properties and a low Curie temperature are chromium dioxide, in the form of fine tetragonal crystals having an acicular form, and modified chromium dioxides. These materials, and their preparation are described in U.S. Pat Nos. 2,956,955; 3,117,093; 3,074,778; 3,078,147; 2,923,683; 2,923,684; 3,034,988; 3,068,176; 2,923,685; 3,278,263. Another material particularly adapted to use in the process of this invention is $x$ iron carbide.

The process will be better understood by a description of an embodiment thereof, which is particularly suited for the replication of tape recordings. The copy member comprises a magnetic material such as chromium dioxide particles which are in the form of a substantially continuous layer on the surface of a plastic support such as polyethylene terephthalate tape which is substantially transparent to visible light. The copying tape is placed with the magnetic material in close proximity to the magnetic material of the original carrying the recorded signal and exposed through the back of the copy to a pulse of visible and/or infrared radiation from an xenon flash tube of the order of a millisecond duration. The magnetic particles of the copy member are momentarily heated by the flash to a temperature greater than the Curie temperature, and then cooled by radiation and by conduction to the binder and the support, which, since it does not substantially absorb the radiation is not substantially heated. The portion of the copy member which was exposed to the flash in contact with the original now contains a replica of the signal on the original. The magnetic material of the original tape is screened from exposure to the pulse of radiation by the magnetic material of the copy tape and is not appreciably heated.

A characteristic of the process of the present invention is that when the heating of the copy member is to a temperature above the Curie temperature it is not cumulative. Thus in the embodiment described above, if the flash exposure is repeated, substantially the same copy is obtained after two, or for that matter 10 flashes as for one. This is because when the magnetic material of the copy member is raised above the Curie temperature in the flash exposure all magnetic signals thereon are erased. When temperatures below, but in the vicinity of the Curie temperature, are employed to effect transfer, partial erasure is obtained.

Accordingly, the process of this invention is readily adaptable to copying continuous strips of magnetic tape by providing drive means to pass the original and copy tapes in face-to-face relationship, nd stationary with respect to each other, through an exposure station wherein the copy tape is exposed to a series of pulses of radiation through the back of its supporting member, the pulses being at such a frequency in relation to the drive speed that each portion of the copy tape is exposed at least once and having an intensity sufficient to heat the magnetic material of the copy member above the Curie point. Since overlapping of exposures does not affect the resulting copy, synchronization of tape speed and pulse frequency is not highly critical and is readily achieved by convenient means.

It will also be appreciated that the magnetic material of the original tape is heated very little in the process, such heating being by radiation and possibly by conduction from the momentarily heated magnetic material of the copy member. Accordingly, the process is applicable when the original and the copy member have the same magnetic material as the working substance. It is further possible to employ a copy member with a stratum of magnetic material having a Curie temperature greater than Curie temperature of the magnetic material of the original tape.

In general, the thermoremanent transfer process provides a copy having an amplified signal. Because the process of the present invention permits copying with a copy member having the same magnetic working material as the original, the signal can be transferred to the copy, then transferred back to the original or to another copy, each step being accompanied by significant amplification. Further, the steps may be repeated to any desired level of amplification up to magnetic saturation.

The term, pulse of radiation, is employed in this specification to denote that in the process of the invention, the magnetic working material of the copy member is exposed to a source of radiant energy for a time which is short in comparison with the cooling processes of radiation and conduction to the surrounding binder or supporting or other materials. Preferably, the pulse of radiation should be as short as possible, but should be less than 100 milliseconds and preferably less than 10 milliseconds. The use of a pulse of radiation requires a source of radiation, which may be uniform over the surface of the copy member (or a portion thereof) and modulated in time, or the radiation may be continuous, directed at a small portion of the copy member, and modulated spatially, i.e., scanned. In view of the noncumulative nature of the process when the heating raises the exposed portions of the copy member above the Curie point, overlap of successive portions of the scan does not detract from the process.

In addition to duplication of the material on the original, generally with amplification, the process of this invention may be employed to modulate an original, i.e., to superimpose a second signal on the signal from the original. Modulation is achieved by spatial variation of the density of the radiation employed for heating, For example, by transmission of an initially uniform source of illumination through a modulator such as a grating or a transparency containing an opaque pattern corresponding to the secondary modulation. Modulation can also be readily accomplished with a continuous source operating in a scanning mode by control of the spatial modulation and/or the intensity of the source.

The exposing energy means can be any source of radiation which is significantly absorbed by and hence capable of heating the hard magnetic working material of the copy member. Visible and infrared radiation such as the pulse obtained from xenon flash tubes are suitable; laser beams and electron beams can also be employed. It will be evident that when electron beams are employed as the source of radiation, the operations are generally conducted in vacuo according to procedures which will be familiar to those skilled in the art.

The initial temperature of the copy member and the original member need not be ambient temperature, but can be any suitable temperature below the Curie temperature of the original and copy member, i.e., the copy member and/or the original member can be thermally biased.

This invention is further illustrated by the following specific embodiment which should not, however, be construed as delineating the scope of this discovery.

EXAMPLE a. PREPARATION OF CHROMIUM DIOXIDE COATED FILM

Dispersion 214 g. $CrO_2$ ($_iH_c$ of 420 Oe, $\sigma_s$ of 79.1 emu/g., $\sigma_r/\sigma_s$ of 0.47), 221 g. methyl isobutyl ketone, 2.7 g. "Yelkin" TTS, 6.75 g. "Aerosol" OT and a solution containing 82.5 g. of "Saran" F220 in 403.5 g. methyl isobutyl ketone were weighed out and the ingredients were blended in a Waring blender for 4 minutes. Next 810 cc. of 80–120 mesh sand were added and the mixture was sand milled for 2 hours. A portion of the mixture was filtered through a 5 micron sintered stainless steel screen. This screen was plugged by the dispersion and the remaining material was filtered through a heavy filter cloth. Methyl isobutyl ketone, 45 g., and Dow Corning 200 silicone fluid, 4.3 g., were added to the filtrate. This dispersion was placed in a 0.4 gallon ball mill with 1,375 g. balls and milled 40 hours. After ball milling, the dispersion was filtered through a 2 micron sintered screen before coating the film.

Coating

This dispersion was coated on 1 mil commercial, biaxially oriented polyethylene terephthalate using a continuous coater. The coating was laid down from a 50 lines/inch gravure roll at 100 ft./min. and smoothed by passage of the coated film over closely-spaced (15 mil gap) N and S poles of an electromagnet. The magnetic particles were oriented longitudinally on the film by passing the coated film between opposed permanent magnetic N and N poles generating a maximum field of 880 Oe in the plane of the film. After orientation, the solvent was removed by passing the coated film through a drying tunnel [front end, 38°–39° C. and contact time, 0.115 minute; back end, 55° to 91° C. and contact time, 0.085 minute ]. The dried coating was calendered at 105° C. by a chrome-plated steel roll operating against a hard rubber roll under a pressure of 800 lbs./inch of roll width to give a final coating thickness of 0.17 mil.

b. SIGNAL TRANSFER AND AMPLIFICATION

Tapes cut from the above were used in the following experiment. A sine wave signal of 1,400 c.p.s. was recorded on a tape at 3¾ i.p.s. with an amplitude of 0.06 v. determined by the playback head of the tape recorder. The recorded tape was placed in face-to-face contact with a second unrecorded tape, and the two tapes were placed against a heated platen at 75° C. with the substrate side of the recorded tape in contact with the platen. The backside of the unrecorded tape was exposed to a short pulse of radiation from G.E. FT–91/L xenon arc lamp charged to 1,000 v. at 140 microfarads. The tapes were cooled to room temperature and separated. The amplitude of the signal recorded on the previously unrecorded tape was found to be 0.12 v. as determined by the playback head of the tape recorder. This tape with a 0.12 v. signal from the first amplification was now placed in contact with another sample of unrecorded film and exposed to the xenon arc exactly as before. The amplitude of the signal from the second amplification thus recorded on the previously unrecorded tape was 0.25 v. This sequence was repeated several times as follows in each case transferring the signal from the previously recorded tape to a new piece of unrecorded tape. The amplitude of the signal at the end of each transfer was as follows. A 0.25 v. signal transferred to give a 0.46 v. signal (third amplification). A 0.46 v. signal transferred to give a 0.9 v. signal (fourth amplification). A 0.9 v. signal transferred to give a 2.2 v. signal (fifth amplification). A 2.2 v. signal transferred to give a 3.1 v. signal (sixth amplification). A 3.1 v. signal transferred to give a 5.0 v. signal (seventh amplification). A 5.0 v. signal transferred to give a 5.8 v. signal in the final transfer (eighth amplification). At this level the signal approached the maximum signal corresponding to the saturation magnetization of the chromium dioxide tape. There was a 97-fold increase in amplitude of the recorded signal from an original 0.06 v. to a final 5.8 v. in eight transfers with amplification; or since the eighth transfer reached saturation, it is perhaps more significant to note the 85-fold increase in amplitude after seven transfers.

The foregoing detailed description has been given for clearness of understanding only and no unnecessary limitations are to be understood therefrom. The invention is not limited to the exact details shown and described, for obvious modifications will occur to those skilled in the art.

The embodiment of the invention in which an exclusive property or privilege is claimed are defined as follows:

1. Method of transferring a signal recorded on an original magnetic recording member to a copy magnetic recording member, said copy member and said original member each comprising a stratum of hard magnetic material on a support, which comprises:
   i. placing the copy member to expose the stratum of hard magnetic material of the copy member to the magnetic field of the signals recorded on the original recording member,
   ii. exposing the magnetic material of the copy member to at least one pulse of exposing radiation having a duration of less than 100 milliseconds while screening the magnetic material of the original recording member from said pulse of radiation, said radiation being capable of heating the hard magnetic material of the copy member, the intensity of said pulse of radiation being sufficient to heat the magnetic material of the copy member to a temperature at least in the vicinity of the Curie temperature, and whereby the support of the copy member and the original member are not substantially heated and
   iii. permitting the magnetic material of the copy member to cool substantially below the Curie temperature while in stationary relationship to the original magnetic recording member.

2. Process of claim 1 in which the magnetic material of the copy magnetic recording member is heated to a temperature above the Curie temperature by said pulse of radiation.

3. Process of claim 2 in which the stratum of magnetic material of the copy member is a substantially continuous film on the surface of the substrate, and is exposed to said pulse of radiation through said substrate, whereby the magnetic material of the copy member screens the magnetic material of the original member from said pulse of radiation.

4. Process of claim 3 in which the magnetic material of the copy member is finely particulate magnetic material.

5. Process of claim 4 in which said pulse of radiation comprises visible and infrared electromagnetic radiation.

6. Process of claim 4 in which said finely particulate magnetic material is chromium dioxide.

PO-1050
(5/69)

UNITED STATES PATENT OFFICE
CERTIFICATE OF CORRECTION

Patent No. 3,613,102                Dated  October 12, 1971

Inventor(s) Nelson B. Daly, Walter H. Gilbert & George R. Nacci

It is certified that error appears in the above-identified patent and that said Letters Patent are hereby corrected as shown below:

On the cover sheet, the filing date should be
          -- November 6, 1968 --

Column 2, line 66, "nd" should be -- and --

Column 3, last line, "Dispersion" should be indented.

Signed and sealed this 21st day of March 1972.

(SEAL)
Attest:

EDWARD M. FLETCHER, JR.        ROBERT GOTTSCHALK
Attesting Officer              Commissioner of Patents